H. Hagaus,
Washing Machine,
N° 4,101,   Patented July 5, 1845.
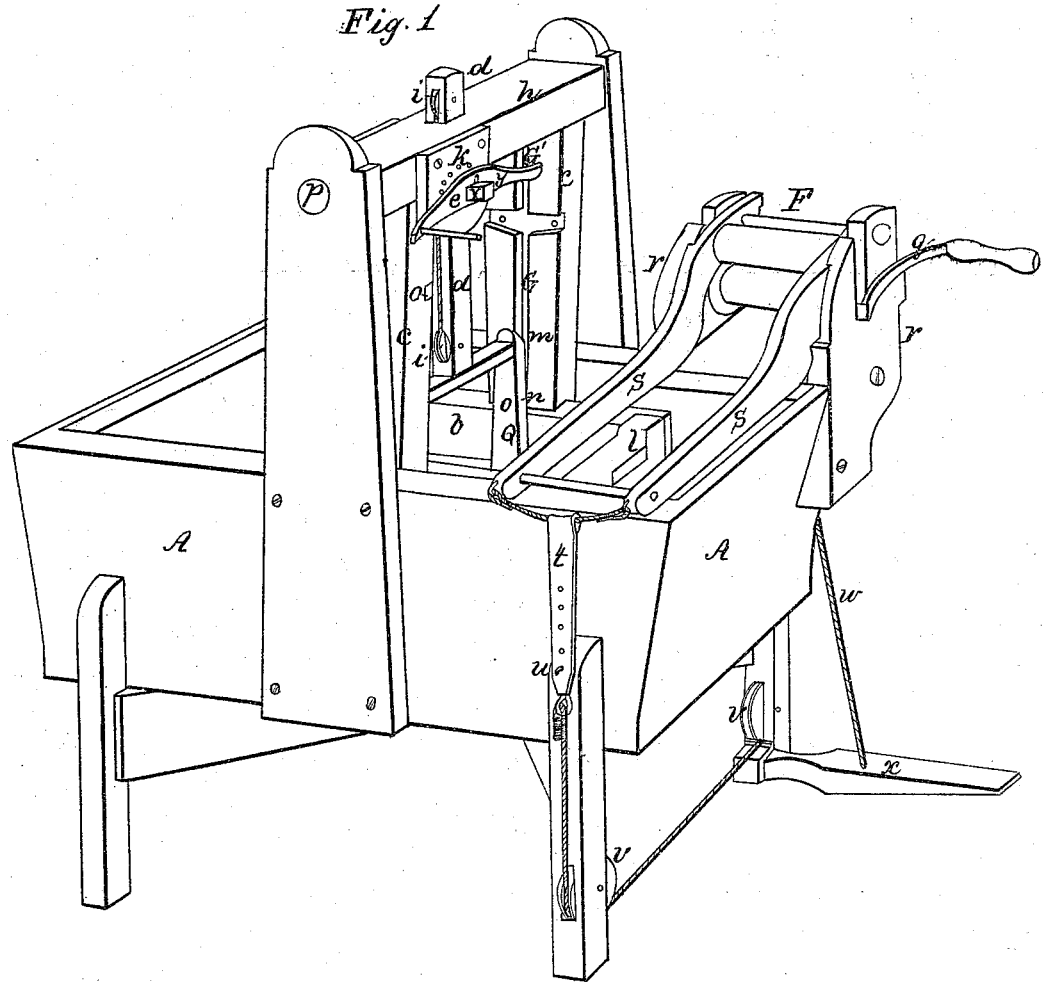

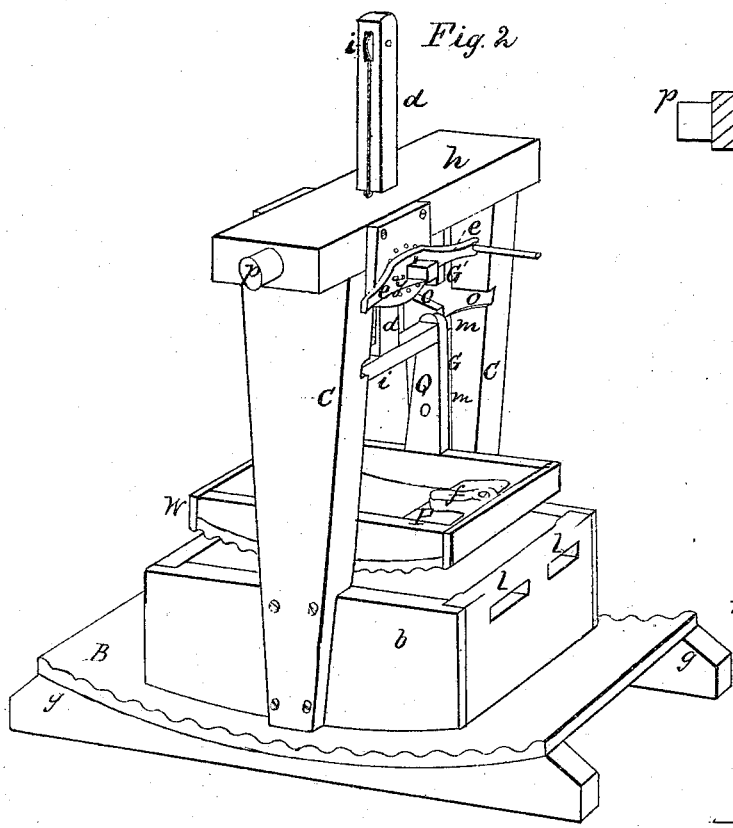
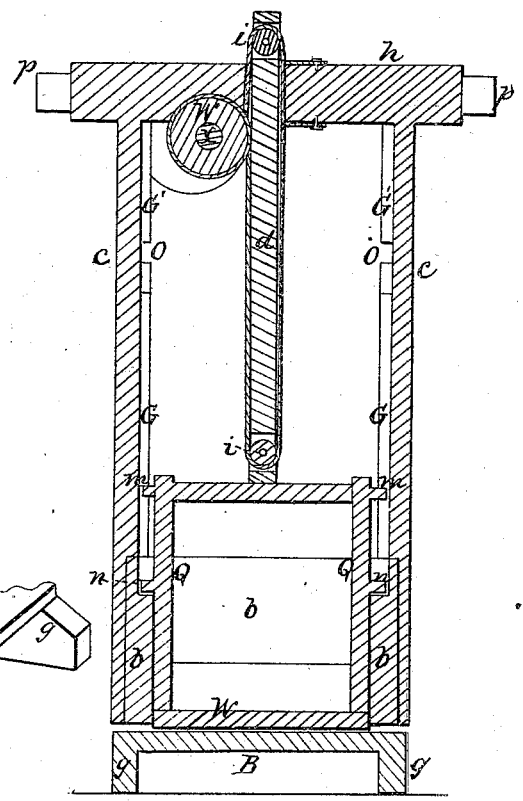

UNITED STATES PATENT OFFICE.

HARRISON HAGAUS, OF BRANDONVILLE, VIRGINIA.

WASHING-MACHINE.

Specification of Letters Patent No. 4,101, dated July 5, 1845.

*To all whom it may concern:*

Be it known that I, HARRISON HAGAUS, of Brandonville, in the county of Preston and State of Virginia, have invented a new and useful Improvement in Machines for Washing and Rolling Clothes, which is described as follows, reference being had to the annexed drawings of the same, making part of this specification.

Figure 1 is a perspective view of the machine. Fig. 2 is a perspective view of the swinging box, the convex fluted rubber concave fluted bed, arms, axle, and other appendages detached from the stationary washing box. Fig. 3 is a vertical section of the combined vibrating box $b$ and washer W—arms C by which it is suspended to the axle $h$—and the stem $d$ and wheel and other appendages by which the washer is raised and lowered.

The washing machine may be made of any dimensions required. The box A of such wood as may be subject to the least change by the variations of the atmosphere, and the joints secured by lead or otherwise. The fluted concave bed B is to be made of smooth solid wood or metal and screwed to the circular bearers $g$—$g$,—the axle $h$, arms $c$, $c$—box $b$, and stem $d$ of smooth wood—the stem $d$ is moved up and down by a small wheel $W^2$ under the axle $h$, with cords thereon running up and down the stem and over and around the pulleys $i$, $i$,—said wheel is operated by the rocking crank $e$ on the axle X of wheel W'. The rocking crank is confined to any point desired by a pin $y$ on the back side, which, by a slight pull of the hand drops into one of a series of holes in a board or plate $k$, through which the axle X of the wheel $W^2$ passes. The guides $m$, $m$, and $n$ $n$ (which are projections formed on the sides of the arms Q of the washer W) move up and down in grooves cut in the inside of the arms $c$, $c$ of the vibrating box $b$, and when raised up to the cross cuts $o$, $o$ in said arms $c$ $c$ a motion of the hand will cause the top washer to swing back out of the way of the operator the guides or projections $n$ passing into the groove $o$ while the guides $m$ remain in the groove G' in the upper part of the arms $c$ $c$. The box $b$ may be vibrated to effect the washing by the application of the hand to the rounds $l$ $l$ or by a lever on the axle $h$ at $p$. The top washer or fluted convex rubber W Figs. 2 and 3 may be made of smooth solid wood or metal, and the labor of operating the machine depends upon the degree of pressure of this section upon the clothes. The clothes are prepared with soap in the usual way, and thrown in a heap into the center of the box $b$, and upon vibrating the machine, they immediately assume the roller form, and by rolling under an even pressure, they are rapidly, safely, and beautifully washed, after two or three changes.

The rolling machine F is constructed of solid wood—the rollers are more open in the center than at the ends, and revolve upon metal journals and brasses, and are turned by the iron crank $q$—the upright sides $r$, $r$, have grooves cut across them on the inside, into which a bottom is fixed which extends with a slight inclination over the edge of the box A to carry back the water—the upper roller is regulated and controlled by the levers $s$, $s$, through which its journals pass—said levers are thrown back and stand out of the way when washing is doing, and when rolling is required they are brought down as in Fig. 1. A slack cord is attached to their ends, to the middle of which is fastened a strap $t$ which is pierced by various holes and falls down to receive the small hook $u$, to which hook is attached a cord which passes under the pulleys $v$, $v$, and runs up to and is inserted into a roller which lies across, immediately under the bottom of the rolling machine, one journal of which appears through the upright $r$, and the other turns in a catch screwed to the box A.

From the outer end of this roller is suspended the cord $w$, which passes through the treadle $x$. The regulation of the roller to suit the size of the article to be rolled is done by inserting the hook $u$, into the strap in a higher or lower hole. The operator with one hand can apply one end of the clothes to the rollers, and with the other, turn the crank, and with one foot upon the treadle, give the required pressure. The rollers being wrapped with linen or other material to give elasticity.

An oblong opening is made in the bottom of the convex rubber W for the insertion of parts of garment, such as wrist-bands of shirts, that are most difficult to wash, and which are held therein by means of a corresponding shutter P nearly fitting said aperture fastened by a button $f$, or other contrivance—the portion of the garment to be subject to the rubbing and rinsing operation projecting through said aperture and extending below the convex surface of the rubber—the body of the garment remaining within the concave of the rubber.

What I claim as my invention and desire to secure by Letters Patent is—

1. The combination of the vibrating box $b$ and convex washer W placed therein, constructed, arranged, and operated in the manner and for the purpose set forth.

2. I likewise claim constructing the washer W with an opening in the bottom provided with a shutter P for holding a part of a garment between the convex surface of the washer W and the concave surface of the bed B while the body of the garment is within the box $b$, as described.

HARRISON HAGAUS.

Witnesses:
A. C. LEACH,
SAMUEL WILES.